(12) United States Patent
Rizzo, Jr. et al.

(10) Patent No.: US 10,456,980 B2
(45) Date of Patent: Oct. 29, 2019

(54) SYSTEM AND PROCESS FOR EVALUATING AND MANUFACTURING ADDITIVELY MANUFACTURED COMPONENTS

(71) Applicant: United Technologies Corporation, Hartford, CT (US)

(72) Inventors: John P. Rizzo, Jr., Vernon, CT (US); Adam Z. Doherty, Manchester, CT (US); Jesse R. Boyer, Middletown, CT (US)

(73) Assignee: United Technologies Corporation, Farmington, CT (US)

( * ) Notice: Subject to any disclaimer, the term of this patent is extended or adjusted under 35 U.S.C. 154(b) by 651 days.

(21) Appl. No.: 14/949,163

(22) Filed: Nov. 23, 2015

(65) Prior Publication Data
US 2016/0144575 A1 May 26, 2016

Related U.S. Application Data

(60) Provisional application No. 62/083,992, filed on Nov. 25, 2014.

(51) Int. Cl.
*B29C 64/386* (2017.01)
*G05B 19/408* (2006.01)
(Continued)

(52) U.S. Cl.
CPC ........ *B29C 64/386* (2017.08); *G05B 19/4083* (2013.01); *G05B 19/4099* (2013.01);
(Continued)

(58) Field of Classification Search
None
See application file for complete search history.

(56) References Cited

U.S. PATENT DOCUMENTS

| 6,405,095 B1 | 6/2002 | Jang et al. |
| 6,782,303 B1 | 8/2004 | Fong |

(Continued)

FOREIGN PATENT DOCUMENTS

| EP | 2583773 | 4/2013 |
| EP | 2583785 | 4/2013 |

(Continued)

OTHER PUBLICATIONS

Campbell, et al., Surface Roughness Visualisation for Rapid Prototyping Models, Sep. 1, 2002, Elsevier, vol. 34, Issue 10, pp. 717-725. (Year: 2002).*

(Continued)

*Primary Examiner* — Monica A Huson
*Assistant Examiner* — Kelsey C Grace
(74) *Attorney, Agent, or Firm* — Carlson, Gaskey & Olds, P.C.

(57) ABSTRACT

An exemplary method for determining a set of additive manufacturing parameters includes, a) determining a nominal parameter of at least one surface of a component, b) determining at least a second order variation in the nominal parameter, c) predicting an actual resultant dimension based at least in part on the nominal parameter and the second order variation, and d) adjusting at least one additive manufacturing process parameter in response to the predicted actual resultant dimension.

16 Claims, 2 Drawing Sheets

(51) Int. Cl.
  *G05B 19/4099*   (2006.01)
  *B33Y 10/00*     (2015.01)
  *B33Y 30/00*     (2015.01)
  *B33Y 50/02*     (2015.01)

(52) U.S. Cl.
  CPC .............. *B33Y 10/00* (2014.12); *B33Y 30/00* (2014.12); *B33Y 50/02* (2014.12); *G05B 2219/49026* (2013.01); *G05B 2219/49084* (2013.01)

(56) References Cited

U.S. PATENT DOCUMENTS

| | | | |
|---|---|---|---|
| 7,704,565 | B2 | 4/2010 | Slaughter |
| 8,506,836 | B2 | 8/2013 | Szuromi et al. |
| 2002/0145213 | A1 | 10/2002 | Liu et al. |
| 2003/0206820 | A1* | 11/2003 | Keicher .................. B05B 7/14 419/9 |
| 2008/0255811 | A1* | 10/2008 | Sheng ................ G06F 17/5018 703/1 |
| 2013/0015609 | A1 | 1/2013 | Landau |
| 2013/0166256 | A1 | 6/2013 | Wirx-Speetjens et al. |
| 2013/0190912 | A1 | 7/2013 | Jywe et al. |
| 2013/0316084 | A1 | 11/2013 | Szuromi et al. |
| 2014/0077422 | A1 | 3/2014 | Minick |

FOREIGN PATENT DOCUMENTS

| | | |
|---|---|---|
| JP | 834064 | 2/1996 |
| JP | 2016516888 | 6/2016 |
| WO | 2013093645 | 6/2013 |
| WO | 20130124650 | 8/2013 |
| WO | 2014131444 | 9/2014 |

OTHER PUBLICATIONS

Ahn, Representation of surface roughness in fused deposition modeling, Aug. 2009, Journal of Materials Processing Technology, vol. 209, Issues 15-16, pp. 5593-5600. (Year: 2009).*

Extended European Search Report for Application No. 15196215.6 dated May 4, 2016.

* cited by examiner

SYSTEM AND PROCESS FOR EVALUATING AND MANUFACTURING ADDITIVELY MANUFACTURED COMPONENTS

CROSS-REFERENCE TO RELATED APPLICATION

This application claims priority to U.S. Provisional Application No. 62/083,992 filed on Nov. 25, 2015.

TECHNICAL FIELD

The present disclosure relates generally to additive manufacturing process, and more specifically to a process for achieving a desired surface roughness on at least one surface of an additively manufactured component.

BACKGROUND

Additive manufacturing is a process that is utilized to create components by applying sequential material layers, with each layer being applied to the previous material layer. Surfaces of an end component created using additive manufacturing have a certain degree of roughness referred to as a surface roughness. The surface roughness occurs due to an inherent stair step surface configuration resulting from the cumulative application of sequential layers during the additive measuring process.

In some components, such as aircraft components, or other components with low tolerances, certain degrees of surface roughness are unacceptable and variations in an output roughness are likewise unacceptable. Existing additive manufacturing processes are designed with the assumption that a desired layer depth is applied at each layer. When variations in the layer depth, or other manufacturing parameters, occur due to process variations, the surface roughness is altered, even when the end component meets dimensional tolerances. As a result, additive manufacturing parameters expected to output a part with a desired set of constraints can output parts outside of those constraints.

SUMMARY OF THE INVENTION

An exemplary method for determining a set of additive manufacturing parameters includes, a) determining a nominal parameter of at least one surface of a component, b) determining at least a second order variation in the nominal parameter, c) predicting an actual resultant dimension based at least in part on the nominal parameter and the second order variation, and d) adjusting at least one additive manufacturing process parameter in response to the predicted actual resultant dimension.

In a further example of the above exemplary method, the nominal parameter is a surface roughness of at least one surface.

A further example of any of the above exemplary methods includes re-iterating a) through d) until the predicted actual surface roughness is within a range of acceptable actual surface roughnesses, and storing a set of additive manufacturing parameters determined in a last iteration of a) through d).

A further example of any of the above exemplary methods includes additively manufacturing at least one component according to the set of additive manufacturing parameters determined in the last iteration of a) through d).

A further example of any of the above exemplary methods includes determining a nominal surface roughness of at least one surface comprises integrating an absolute valve of a difference between a surface point and a mean line over at least one surface.

A further example of any of the above exemplary methods includes determining at least a second order variation comprises determining at least two variations.

A further example of any of the above exemplary methods includes predicting an actual resultant dimension based at least in part on the nominal parameter and the second order variation comprises determining an expected effect of at least one second order variation on the nominal parameter.

A further example of any of the above exemplary methods includes determining an expected effect of the at least one second variation on the nominal parameter compromises applying a probabilistic distribution of the at least one second order variation to the nominal parameter.

A further example of any of the above exemplary methods includes determining an expected effect of the at least one second variation on the nominal parameter compromises applying a mechanistic distribution of the at least one second order variation to the nominal parameter.

A further example of any of the above exemplary methods includes determining an expected effect of the at least one second variation on the nominal parameter compromises applying a mathematically determined physics distribution of the at least one second order variation to the nominal parameter.

In one exemplary embodiment, an additive manufacturing machine includes an additive manufacturing chamber, and a controller operable to control the additive manufacturing chamber. The controller includes a processor and a non-transitory memory. The non-transitory memory includes instructions operable to iteratively convert a set of desired output component parameters into asset of manufacturing parameters. The manufacturing parameters are adjusted to compensate for at least one second order variation.

In another exemplary embodiment of the above-described additive manufacturing machine the instructions are operable to cause the controller to iteratively perform a method including a) determining a nominal parameter of at least one surface of a component, b) determining at least a second order variation in the nominal parameter, c) predicting an actual resultant dimension based at least in part on the nominal parameter and the second order variation, and d) adjusting at least one additive manufacturing process parameter in response to the predicted actual parameter.

In another exemplary embodiment of the above-described additive manufacturing machine the nominal parameter is a surface roughness.

In another exemplary embodiment of the above-described additive manufacturing machine the non-transitory memory stores at least one of a probabilistic distribution of a second order variation, a mechanistic distribution of a second order variation, and a mathematically determined physics based distribution of a second order variation.

In another exemplary embodiment of the above-described additive manufacturing machine the controller includes a communication link operable to retrieve one of a probabilistic distribution of a second order variation, a mechanistic distribution of a second order variation, and a mathematically determined physics based distribution of a second order variation during an iterative process.

An exemplary method for iteratively determining a set of additive manufacturing parameters includes, predicting an actual resultant dimension based at least in part on a nominal parameter and a second order variation in the additive manufacturing process. Adjusting at least one additive manufacturing process parameter in response to the predicted actual resultant dimension.

A further example of the above exemplary method includes predicting an actual resultant dimension based at least in part on a nominal parameter and a second order variation in the additive manufacturing process. Adjusting at least one additive manufacturing process parameter in response to the predicted actual resultant dimension is iterated until the an expected actual output component is within design tolerances.

In a further example of any of the above exemplary methods determination of the expected actual output component includes an estimated impact of at least one second order variation in the additive manufacturing process.

In a further example of any of the above exemplary methods the actual resultant dimension is a surface roughness.

These and other features of the present invention can be best understood from the following specification and drawings, the following of which is a brief description.

DETAILED DESCRIPTION OF AN EMBODIMENT

Figure 1:
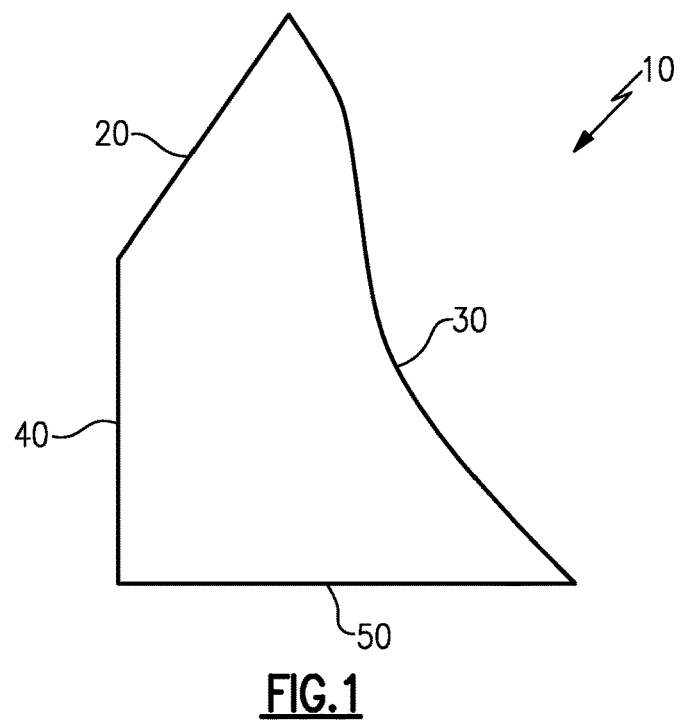
FIG. 1 schematically illustrates an example desired profile of an additively manufactured component.

FIG. 1 schematically illustrates an exemplary desired profile 10 of an additively manufactured component. The profile 10 includes multiple surfaces 20, 30, 40, 50, each of which is created during the additive manufacturing process. Additive manufacturing utilizes the sequential application of material layers, beginning with a base layer, and building up to a desired part shape. Each subsequent layer has a different shape, resulting in a stacked configuration of layers that creates a part having a desired profile 10.

Due to the sequential stacking of layers, angled and curved surfaces, such as the illustrated angled surface 20 and the illustrated curved surface 30, include a stair stepped surface configuration in an end component. The stair stepped configuration imparts a degree of surface roughness on the angled or curved surfaces 20, 30. While the desired profile 10 includes smooth surfaces 20, 30, 40, 50, an acceptable degree of roughness due to the additive manufacturing process can fall within tolerances, even on a tightly toleranced component.

Figure 2:
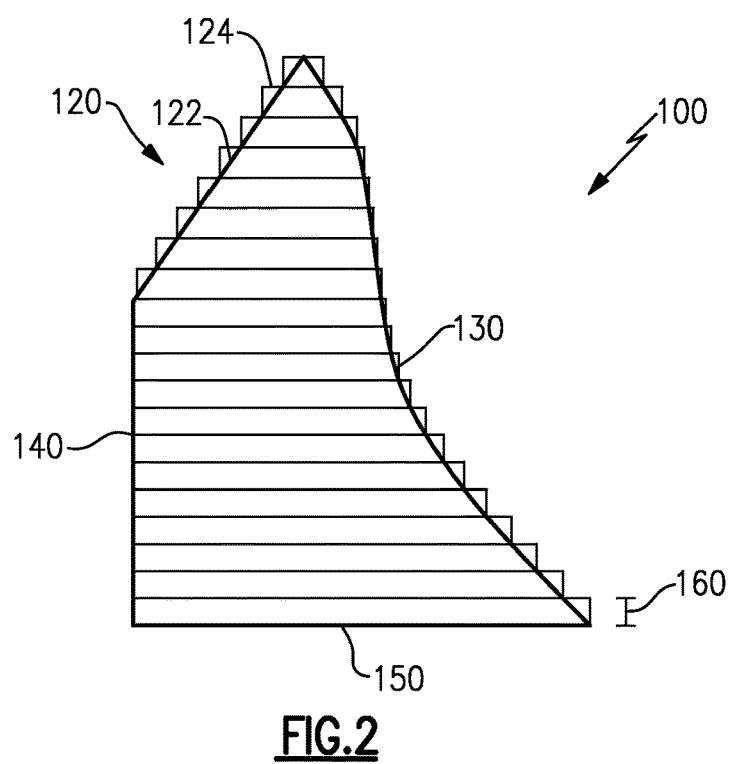
FIG. 2 schematically illustrates an additively manufactured output profile of the desired profile of FIG. 1.

FIG. 2 schematically illustrates a nominal profile 100 of a nominal output component from an additive manufacturing process configured to create the component profile 10 illustrated in FIG. 1. The nominal output component is the expected output component, assuming no variations from the expected parameters of the additive manufacturing process. On each of the angled or curved surfaces 120, 130, the stair stepped feature is created due to the presence of the discrete layers. The particular overhang of each layer varies with the desired angle or curvature of the angled or curved surface 120, 130, resulting in a varied surface roughness across all the surfaces 120, 130, 140, 150. Each layer in the nominal example is the same layer height 160, with the expected layer height 160 being determined by the input parameters of the additive manufacturing process.

The surface roughness of a given surface 120, 130, 140, 150 can be expressed as $Ra=\int(|S_p-M_1|)$, where Ra is the average surface roughness of the surface, $|S_p-M_1|$ is the absolute value of the distance between the surface and a mean line defining the average surface, and the integral is taken across the entirety of the surface. The surface point is a point on the exterior surface of the nominal profile, and the mean line is the surface line of the desired profile. By way of example, with regards to the angled surface 120, a mean line 122 extends along the desired surface, and a surface point 124 is the exterior most point of the nominal output component 100 at a given point along the mean line 122. The difference between the surface point 124 and the mean line 122 is the length between the mean line 122 and a surface point 124 normal to the mean line 122.

While discussed below using the Ra notation for surface roughness, one of skill in the art having the benefit of this disclosure will understand that the surface roughness can be expressed using alternative expressions, notations, or calculations, and still be utilized in the processes and systems described herein. Further, the following process can be modified by one of skill in the art to utilize any alternative expression of the surface roughness.

In the nominal example, the roughness of any given surface 120, 130, 140, 150 can be mathematically determined prior to creation of a physical component. The nominal surface roughness of any given surface 120, 130, 140, 150 is referred to herein as a first order estimation, because it considers the expected layer height 160 of each layer in determining an expected surface roughness, and does take any potential variations into account.

In practical operation, additive manufacturing techniques include additional variations that are not accounted for in the nominal estimation illustrated in FIG. 2. Such additional variations can include, but are not limited to, powder perturbations during the additive manufacturing process, powder particle size variations, orientation of the part during the additive manufacturing process, power source variations, beam profile, orientation of a sintered surface relative to prior and subsequent sintered surfaces, etc. The additional variations are referred to as second order variations.

As a result of the second order variations, parameters for an additive manufacturing process designed to produce the nominal example can, in some cases, produce components with a surface roughness outside of allowed tolerances. Existing systems compensate for the second order variables by creating physical sample parts, manually checking the surface roughness of the created sample part, and tweaking additive manufacturing parameters to compensate for the empirically measured surface roughness resulting from the second order variations. Once determined, the modified parameters are used to create a second iteration of the component, and the second iteration is manually checked to determine if the surface roughness of the created component is within the tolerances of the nominal profile 100. This process is iterated until an adequate set of additive manufacturing parameters for creating an actual output component matching the desired component is determined. As a result of the iterative creation of physical components, significant quantities of unacceptable components are created, resulting in scrap components and wasted time and materials.

Figure 3:
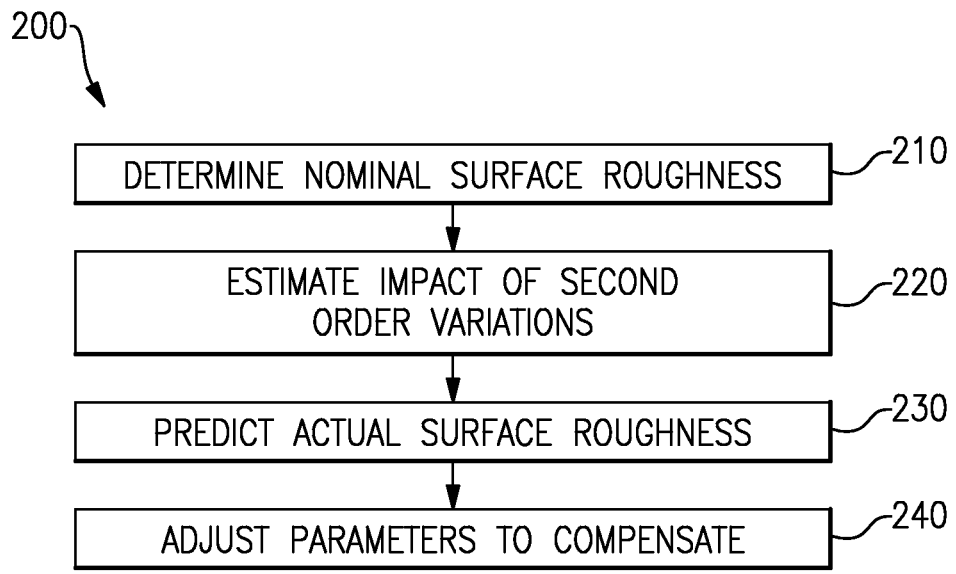
FIG. 3 illustrates a flowchart of a process for designing additive manufacturing parameters for a component.

With continued reference to the nominal component of FIG. 2, FIG. 3 illustrates a flow chart demonstrating a process 200 for designing additive manufacturing parameters capable of generating an actual component within tolerances of a nominal component 100 without requiring the creation of significant numbers of physical proto-type components.

Initially the process 200 determines a surface roughness of at least one surface 120, 130, 140, 150 of the nominal component in a "Determine Nominal Surface Roughness" step 210. The nominal surface roughness (Ra) of the at least one surface 120, 130, 140, 150 is computed as described above and incorporates the expected nominal layer height 160, in the computation of the expected surface roughness. Once the nominal surface roughness has been calculated, the process 200 determines any relevant second order variations, and estimates the impact those second order variations have on the expected surface roughness in an "Estimate Impact of Second Order Variations" step 220.

The estimated impact of a given second order variation can be determined in multiple ways. In one example, the impact is represented as a probabilistic distribution of variations. To determine the impact of the second order variation, the probabilistic distribution is applied probabilistically across the surface 120, 130, 140, 150 or surfaces 120, 130, 140, 150 being estimated. In one specific example of a powder size variation, a processor performing the estimation step will include a data storage element storing information informing the processor that particles within the specific powder being used to create the additively manufactured part are distributed with 10% being in a small sized range, 80% being in a medium sized range, and 10% being in a large sized range.

The estimate impact of second order variations step 220, applies the probabilistic distribution to the nominal layer heights 160 and determines an estimated layer height 160 for each layer based on the probabilistic distribution. This results in a variation across the layers with approximately 10% of the layers being in a small sized ration range, 80% being in the medium sized variation range, and 10% being in a large sized variation range. The 10%, 80%, 10% distribution is purely exemplary in nature, and the values are selected for ease of explanation. One of skill in the art, having the benefit of this disclosure, will understand that a probabilistic distribution can have significantly different numbers of values, and significantly different values. The general process for applying a probabilistic distribution is the same regardless of the specific values within the probabilistic distribution.

In another example, the second order variations are estimated using a mechanistic distribution. In a mechanistic distribution, a sample distribution of the particular second order variation being accounted for is stored within the system estimating the impact of the second order variation. The sample distribution is representative of variation measurements from at least one empirical sample. The mechanistic distribution is applied to the nominal component 100, in a similar manner as the probabilistic distribution. In some examples the mechanistic distribution is a mathematical combination of multiple empirical sample distributions. By way of example, the mathematical combination can be an average or a weighted average.

In yet another example, the second order variations are estimated using a physics based distribution. The physics based distribution is determined mathematically applying physical mechanics to determine an expected variation distribution. The mathematical model of the variation can either be stored in the system prior to the process 200, or determined during operation of the process 200 by a processor or other controller.

In yet a further example, two or more of the above described distributions are combined, and the combined distribution is utilized to estimate the impact of the second order variation. Alternatively, the impacts of each second order variation used can be estimated individually and mathematically combined. The particular type, or types, of second order variation distributions utilized depend on the particular variation being accounted for. One of skill in the art, having the benefit of this disclosure, can determine a suitable distribution type or types for a given second order variation.

Once the estimated impact of the second order variations has been determined, the impact is applied to the nominal component 100 as dictated by the particular distribution model used, and the layers of the model component are adjusted. The adjusted layers create an estimated actual model based on the nominal component 100 as modified by the application of the second order variation.

Once the estimated actual model has been calculated, the process 200 predicts an actual surface roughness of the at least one surface 120, 130, 140, 150 of the estimated actual model. The process 200 performs a surface roughness analysis on the adjusted model in a "Predict Actual Surface Roughness" step 230. The surface roughness of the estimated actual model is determined in the same manner as the nominal roughness, with the exception that the surface roughness is determined from the estimated actual model instead of the nominal model.

The surface roughness of at least one surface 120, 130, 140, 150 of the estimated actual model is then compared against the desired surface roughness. If the estimated actual surface roughness is outside of acceptable ranges of surface roughnesses, the initial additive manufacturing model parameters are adjusted in an "Adjust Parameters to Compensate" step 240. The initial parameters of the additive manufacturing process are adjusted in the same manner as adjustments made in existing systems where a physical prototype is constructed and analyzed.

Once the initial parameters are adjusted, the process 200 re-iterates until the surface roughnesses of the expected actual component are within tolerances of the desired component. Upon completion of the iterations, final additive manufacturing parameters are output. The additive manufacturing parameters can be stored in a database, used to create the desired component, or used for any other desired purpose.

In some examples, the initial parameters are automatically adjusted in the Adjust Parameters to Compensate step 240. In some alternative examples, an operator manually reviews the predicted actual surface roughness and manually adjusts the initial parameters in the Adjust Parameters to Compensate step 240.

In some examples, the entire process 200 is automated, and is performed at an additive manufacturing machine. In such examples, the desired component model (illustrated in FIG. 1) is input, as well as any tolerances including surface roughness tolerances. The additive manufacturing machine includes a processor that performs the process 200 described above, and determines actual output parameters based on the desired component, and the iterative process. The additive manufacturing machine then creates the component using the parameters determined by the iterative process.

While described above with regards to a surface roughness, one of skill in the art, having the benefit of this disclosure, will understand that the process can be adapted to adjust for one or more other output parameters, and is not limited to a surface roughness.

With continued reference to FIGS. 1-3, FIG. 4 schematically illustrates an additive manufacturing machine 300. The exemplary additive manufacturing machine 300 includes a manufacturing chamber 310 with a platform 320 upon which a part 330 is additively manufactured. A controller 340 is connected to the chamber and controls the additive manufacturing process according to any known additive manufacturing control system.

Included within the controller 340 is a processor 342 that receives and interprets input parameters to define the shape of the part 330 being additively manufactured. The controller 340 can, in some examples, include a user interface device such as a keyboard and view screen. In alternative examples, the controller 340 can include a wireless or wired communication apparatus for communicating with a user's input device.

Also included in the controller 340 is a memory 344. In some examples, the controller 340 receives the desired output profile of a component to be manufactured, including desired tolerances. The processor converts the desired output profile to a set of initial parameters for creating the component. The processor 342 and the memory 340 operate in conjunction to perform the process illustrated in FIG. 3, and described above, and thereby determine an end set of parameters required to create the actual component within desired tolerances.

In such an example, the memory 344 stores any required second order variation distributions, or includes subroutines enabling the processor 342 to retrieve the distributions from an external database.

Figure 4:
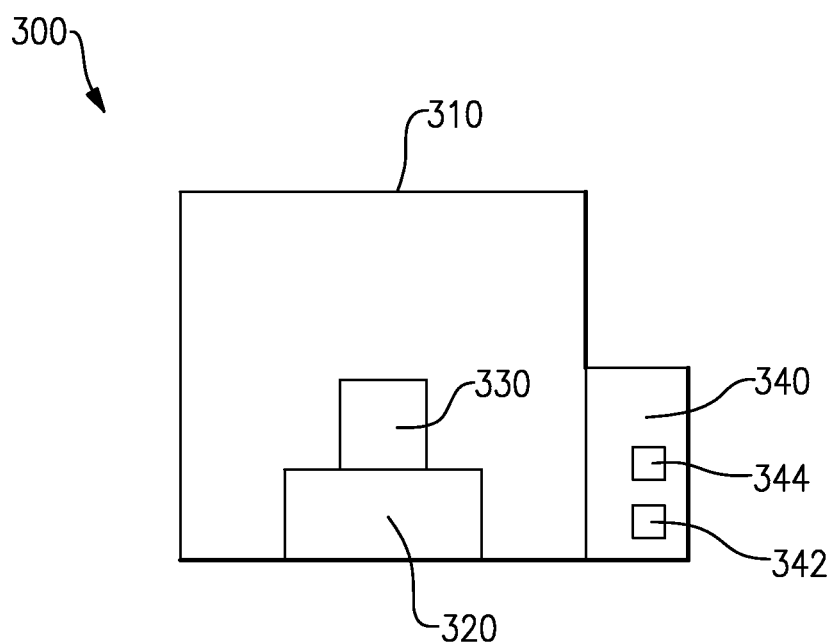
FIG. 4 schematically illustrates an additive manufacturing machine capable of performing at least part of the process of FIG. 3.

In this way, the additive manufacturing machine 300 of FIG. 4 receives a set of desired output dimensions and tolerances and iteratively determines a set of parameters required to create a component meeting the desired output dimensions and tolerances without requiring or utilizing the creation of multiple waste prototypes.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. An additive manufacturing machine comprising:
an additive manufacturing chamber; and
a controller operable to control said additive manufacturing chamber, wherein the controller includes a processor and a non-transitory memory, the non-transitory memory including instructions operable to iteratively convert a set of desired output component parameters into a set of manufacturing parameters without constructing a physical component, the manufacturing parameters being adjusted to compensate for at least two second order variations, wherein the instructions are operable to cause the controller to iteratively perform a method including:
a) determining a nominal parameter of at least one surface of a component, wherein the nominal parameter is a parameter of a nominal component;
b) determining the at least two second order variations in said nominal parameter;
c) predicting an actual resultant dimension based at least in part on the nominal parameter and the at least two second order variations, the at least two second order variations includes at least one of powder perturbations, powder particle size variations, power source variations, beam profile, and orientation of a sintered surface relative to prior and subsequent sintered surfaces; and
d) adjusting at least one additive manufacturing process parameter in response to said predicted actual parameter.

2. The additive manufacturing machine of claim 1, wherein the nominal parameter is a surface roughness.

3. The additive manufacturing machine of claim 1, wherein the non-transitory memory stores at least one of a probabilistic distribution of a second order variation, a mechanistic distribution of a second order variation, and a mathematically determined physics based distribution of a second order variation.

4. The additive manufacturing machine of claim 1, wherein the controller includes a communication link operable to retrieve one of a probabilistic distribution of a second order variation, a mechanistic distribution of a second order variation, and a mathematically determined physics based distribution of a second order variation during an iterative process.

5. The additive manufacturing machine of claim 1, wherein the non-transitory memory further includes instructions configured to cause the processor to re-iterate steps a) through d) until the predicted actual surface roughness is within a range of acceptable actual surface roughnesses, and instructions to cause the processor to store a set of additive manufacturing parameters determined in a last iteration of a) through d).

6. The additive manufacturing machine of claim 5, wherein the non-transitory memory further includes instructions configured to cause the additive manufacturing machine to additively manufacturing at least one component according to said set of additive manufacturing parameters determined in said last iteration of a) through d).

7. The additive manufacturing machine of claim 2, wherein determining a nominal surface roughness of at least one surface comprises integrating an absolute value of a difference between a surface point and a mean line over at least one surface.

8. The additive manufacturing machine of claim 1, wherein predicting an actual resultant dimension based at least in part on the nominal parameter and the second order variation comprises determining an expected effect of at least one second order variation on the nominal parameter.

9. The additive manufacturing machine of claim 8, wherein determining an expected effect of the at least one second variation on the nominal parameter compromises applying a probabilistic distribution of the at least one second order variation to the nominal parameter.

10. The additive manufacturing machine of claim 8, wherein determining an expected effect of the at least one second variation on the nominal parameter compromises applying a mechanistic distribution of the at least one second order variation to the nominal parameter.

11. The additive manufacturing machine of claim 8, wherein determining an expected effect of the at least one second variation on the nominal parameter compromises applying a mathematically determined physics distribution of the at least one second order variation to the nominal parameter.

12. The additive manufacturing machine of claim 1, wherein the at least two second order variations includes powder perturbations.

13. The additive manufacturing machine of claim 1, wherein the at least two second order variations includes powder particle size variations.

14. The additive manufacturing machine of claim 1, wherein the at least two second order variations includes power source variations.

15. The additive manufacturing machine of claim 1, wherein the at least two second order variations includes beam profile.

16. The additive manufacturing machine of claim 1, wherein the at least two second order variations includes orientation of a sintered surface relative to prior and subsequent sintered surfaces.

* * * * *